April 23, 1940. E. H. CHANDONIA 2,198,105
MULTIPLE BAKING PAN STRUCTURE
Filed Jan. 27, 1938
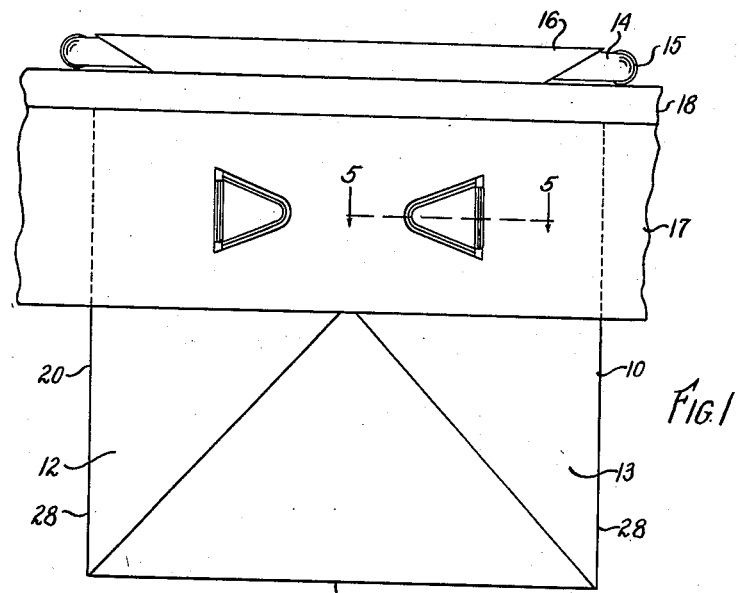
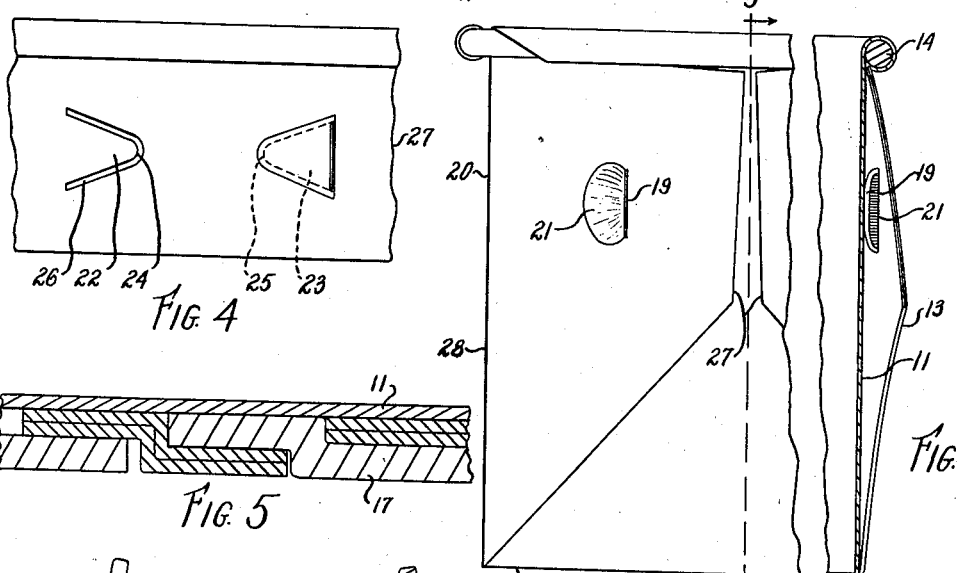
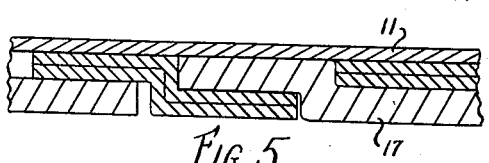
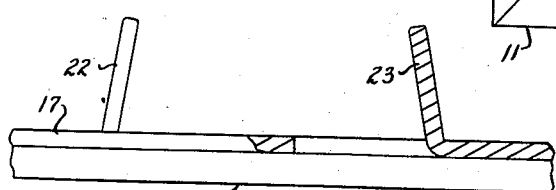
INVENTOR.
Elmer H. Chandonia
BY
Frank Zugster
ATTORNEY.

Patented Apr. 23, 1940

2,198,105

UNITED STATES PATENT OFFICE 2,198,105

MULTIPLE BAKING PAN STRUCTURE

Elmer H. Chandonia, Amelia, Ohio, assignor to The Lockwood Manufacturing Company, Cincinnati, Ohio, a corporation of Ohio Application January 27, 1938, Serial No. 187,240

4 Claims. (Cl. 53—6)

This invention is concerned with the attachment together of a multiplicity of individual folded sheet metal baking pans, by means of strapping, in accordance with the general idea incorporated in my prior Patent 2,037,759 and my Patent No. 2,143,728.

The instant invention is concerned with certain features of simplification of fabrication of multiple pan units, whereby to attain advantages of rigid mounting and connection of pans and strapping, together with various manufacturing advantages, heretofore unattainable by the various structures disclosed in this art. The large number of patents heretofore issued in this art, bear mute evidence of the failure of prior inventors to effectively solve the practical problems met in the regular and ordinary usage of the prior art devices.

An object of the invention is to obviate the various practicable objections and difficulties, common to prior art devices of this general character.

Another object is to provide an arrangement of parts, that presents a very simple, effective and efficient locking of pans and strapping, and which also affords manufacturing advantages and features that obviate the expensive, slow and tedious practices necessary and incidental to the fabrication of prior art devices of the same general character.

Another object is to provide an arrangement which permits attachment of the strapping to the pan folds, close to the corners of the pans, thus giving substantial attachment of those parts and also minimizing any loosening effect upon those parts incident to rocking of pans in the strapping that generally develops after a period of use of multiple pan units, by reason of the hard usage to which such pan units are subjected.

Another object is to so relate the attachment lugs on the strapping to the fold forming sheet metal of the pan, that distortion of the sheet metal, incident to clamping of the strapping and pans, will have a minimum of effect upon the pan bodies, as concerns creation of stresses and strains which undoubtedly have been in large measure, responsible for difficulties and objections encountered in prior art devices.

These and other objects are attained by the means described herein and disclosed in the accompanying drawing, in which:

Fig. 1 is an end elevation of a pan having strapping attached thereto, in accordance with the invention.

Fig. 2 is a fragmental end view of a pan showing the relation of parts thereof, preparatory to attachment thereof to strapping.

Fig. 3 is sectional view on line 3—3 of Fig. 2.

Fig. 4 is a fragmental side view of strapping and lugs, forming details of the invention.

Fig. 5 is an enlarged sectional view on line 5—5 of Fig. 1.

Fig. 6 is a fragmental view of strapping and lugs, forming details of the invention.

Pans 10, of which two or more are placed side by side, each comprise ends 11 and end folds 12 and 13. A suitable wire 14 may encircle each top of the pan, and the upper edges 15 and 16 of the sides and ends respectively, of the pans may be curled about the wire, in accordance with customary practice in the sheet metal baking pan art. The end fold members are formed by the sheet metal extending from the end and side walls of the pan, incident to forming the corners of the pans. This end fold material comprises a double ply of sheet metal, which is turned over the ends of the pan. The end fold members at any end of a pan converge upwardly and toward one another incident to the forming or folding of the initially flat sheet metal into baking pan shape or form. The upper edges of the end fold members are disposed at or adjacent to the wire 14 and the upper edges of the side and end walls are curled about the wire 14. For purpose of clarity of meaning, the ply of material adjacent to the end of the pan is herein called the inner ply and the other associated ply of material is called the outer ply of any end fold member.

The strapping 17 may comprise the beaded edge 18 adapted to rest under and support the upper portions of the pan walls.

The folds of the pans may conform in general form and arrangement with customary practice. As shown herein, the folds are each pierced by a substantially vertical, relatively narrow but elongated slit, 19 and the metal lying adjacent the slit and outwardly or toward the side wall 20, is depressed whereby to produce a pocket 21 which may be said to slope or discharge into the slit, the slit forming a mouth for the pocket. The slits in adjacent plies of any end fold member, register with one another, and said slits are disposed wholly interiorly of the edges of the end fold members so that a substantial portion of the end fold material extends in every direction from the slit, whereby to substantially space the slits from every edge of the end fold material. Thus slitting of the end fold material has no appreciable weakening effect upon the general strength of the end fold members or their ability to meet and carry the loads and strains that are imposed thereon incident to ordinary usage of the multiple pan assembly. Accordingly, the walls of said slits may be said to be continuous in that such slits do not register with or run into any of the edges of the end fold material as shown at 16 in Whalen Patent 1,105,584. The indicated pocket and mouth formation is produced incident to slitting the folds and the dished formation of the pocket, and the discharge thereof into the slit or mouth, serves to guide the lugs into their final positions, incident to the operation of locking the pans and strapping together.

Preferably the lugs 22 and 23, which are disposed in cooperating pairs at intervals along the strapping, when initially struck from or formed from the strapping are slightly inclined toward one another, the spacing of the free ends 24 and 25 of each pair of lugs approximating the spacing of the slits 19 provided in the adjacent folds 12 and 13 of any pan 10. Incident to forming the lugs 22 and 23, a small strip of metal, is struck out of the strapping, such strip approximating the dimensions of the opening indicated at 26 of Fig. 4. The lugs, incident to formation thereof, are bent at an angle of approximately ninety degrees to the plane of the body portion 27 of the strapping. Consequently, when a pan and the free ends of a cooperating pair of lugs are so positioned that the lugs are disposed in the pockets, at approximately the mouths 19 of said pockets, and the parts, so related are subjected to the action of a suitable power press, the lugs are returned to a substantially flat or aligned position relative to the body 27 of the strapping. At such time the free ends 24 and 25 of the generally triangularly shaped lugs are brought toward one another to positions substantially as shown in Fig. 4. It is to be understood that by reason of the introduction of the pan fold material into the openings formed incident to the angular positioning of the lugs on the strapping, the material of the lugs cannot return to exactly the same position that such material bore in the first instance to the remainder of the strapping material. Preferably the strapping is slightly thicker than the two plies of pan fold material, wherefore some of the material of each lug together with two plies of the pan fold material is finally pressed into the openings made in the strapping incident to striking the lugs from the strapping. By reason thereof, a very stout and rigid locking of pan and strapping is effected. Naturally there will be some slight flattening or spreading of the material constituting the lugs and pan fold material, incident to the indicated pressing or interlocking action. The lateral expression of such metal not only reduces the thickness of such metal parts, but also serves to bring those metal parts into firm or substantial contact with various of the adjacent edges of the strapping, notwithstanding the fact that incident to the striking of the lugs from the strapping, the strip of strapping material, represented by the opening 26 in Fig. 4, has been eliminated.

By so arranging the strapping lugs so the free ends thereof project toward one another, any tendency toward separation of strapping and pan is resisted by the pan fold material lying between the slits 19 and the vertical corner of the pan, including the material forming the pockets 21. In previous type of pan units, wherein the lugs associated with any pan, extended away from one another, for example as shown in my said patent, the free ends such as 27 of the fold material, offered little or no resistance to such separating action. The hard usage ordinarily given to pans of the character under consideration, tends to effect some degree of divergence of such pan fold ends as 27, and consequently there is in such prior devices, the possibility of relative lateral shifting of lugs and pan fold material which manifests itself by loosening of the connections between the pans and the strapping. By the arrangement disclosed herein, the same forces that tend to effect the indicated looseness in the prior art devices tend to enhance the security or rigidity of connection of the strapping and pans when related as disclosed herein. The fact that all the pan metal on both sides of each pan corner such as 28, is rigidly held by reason of the connection of the vertical pan walls with the pan bottom, and also by the reinforcing pan top construction, which ordinarily includes a wire member such as 14, gives a much more rigid and fixed positioning of the pan fold material between the slit 19 and the pan corner, than is attainable by the pan fold material between the slit 19 and the end 27 of the pan fold material. The invention disclosed herein, utilizes these factors and converts same into part of a substantial and rigid mounting between the pans and the strapping.

In fabricating the multiple pan assembly, the pan bodies are completed to the extent that the imperforate end folds are turned over the ends of the pan. Then a wedge like member is inserted between the end of the pan and the end fold members. While the wedge is positioned, a slitting die is operated to pierce the double plies of the end fold members at opposite edges of the wedge. Thus registration of the slits in the adjacent plies of each end fold member is assured and the end wall of the pan is guarded against any possible injury or mutilation. Incident to slitting the end fold members, portions of the slitting die form the depressions or pockets 21 which serve as guides for directing the lugs on the strapping inwardly through the outer and inner plies of the end folds. After the slitting and pocket forming operation, a piece of strapping, having the free ends thereof turned to substantially the positions shown in Fig. 6, is positioned in a press, with the free ends of the lugs disposed in the pockets 21. The subsequent operation of the press causes the lugs to roll, bend or turn, progressively throughout their length, as they are fed through the slits until substantially the entire lug body has been passed through a slit and has been returned to a position or form disposed in substantial parallelism with and between the end wall of the pan and the inner ply of the end fold member, substantially as shown in Fig. 5. The apparent operation is merely the ordinary power stroke of a press.

What is claimed is:

1. The process of constructing a bake pan unit, which process includes the forming of pans including a pair of integral pan fold members, at one end thereof, then providing a pocket and an associated slit in each of the pan fold members, the slits extending in a generally vertical direction, each pocket being disposed between its associated slit and the adjacent pan edge at which said end fold member is attached to the pan, striking a pair of lugs from strapping, each at an angle of approximately ninety degrees to the body of the strapping, and at a distance approximating the distance between the slits in the end fold members, introducing the ends of the lugs into the pockets, at said slits, and then applying pressure to said parts whereby the pockets guide and direct the lugs into said slits and for returning the lug portions extending through the slits into a position in substantial parallelism with the strapping.

2. The method of constructing a bake pan unit, which method includes the steps of shaping a sheet metal blank into pan formation with pockets and slitted end folds overlying one of its walls, said slits constituting mouths associated with said pockets, striking triangular lugs from strapping, said lugs having free ends spaced at approximately the distance between the slits in the end folds of the pan, disposing the free ends of the lugs in the pockets adjacent the slits and then urging the lugs against the pockets whereby the lugs, beginning at the free ends thereof are progressively directed, turned or bent as they are directed by the pockets into the slits and the portions of the lugs after passing through the slits are pressed against the pan fold members for interlocking the pan and the strapping.

3. In a multiple pan unit of the class described the combination with a plurality of sheet metal pans, each having opposed ends and a pair of end fold members, said members each comprising two plies of sheet metal and having substantially vertical slits in said end fold members, of strapping extending along the pans and disposed adjacent and over the slitted portions of said end fold members, said strapping having a plurality of pairs of elongated triangular integral lugs formed therefrom whereby to provide a plurality of openings in the strapping, one lug being provided for each slitted end fold member of the pans, each of said lugs being integral along one of its sides with said strapping, the free end of said lug extending through the slitted two plies of an end fold member of the pans and disposed between a pan end and the adjacent face or innermost portion of the adjacent end fold member, the pair of lugs extending through the pair of end fold members at an end of a given pan having their free ends turned in opposite directions, the pan fold material intermediate the lugs and the strapping being deformed and pressed into the openings provided incident to formation of the lugs, and the lugs being nested in the deformed portions of the end fold members.

4. A multiple sheet metal pan assembly comprising a plurality of substantially identical sheet metal pans, and strapping joining said pans and connected individually with each of said pans, each of said pans comprising side walls and ends, the material extending beyond the corners provided at the junction of the walls and ends being folded into double ply end fold members disposed externally of the adjacent end members and converging upwardly and toward one another, whereby to provide a pair of end fold members at each end of each pan, each ply of said end fold members having a relatively narrow but elongated slit formed therein and registering with a similar slit in its associated ply member, the walls of said slits being continuous and being spaced in every part a substantial distance from the edges of said end fold members, the strapping comprising pairs of integral lugs, a pair of such lugs being provided for each pair of pan fold members of each pan, each lug having a free leading end and having a connector end integral with the strapping, the leading ends of each of the lugs being inserted inwardly through the registering slits in a pair of associated ply members so as to lie wholly between an end wall and the inner ply of a pair of associated ply members, the lugs associated with an end of a given pan being disposed in substantial parallelism with the strapping and extending in opposite directions and the double ply end fold material being deformed to lie outwardly of the lugs and to extend between the free edges of the lugs and the adjacent strapping from which the lugs are formed.

ELMER H. CHANDONIA.